(12) United States Patent
Eder et al.

(10) Patent No.: US 10,828,129 B2
(45) Date of Patent: Nov. 10, 2020

(54) TOOL-COUPLING DEVICE FOR A VIBRATION TRANSFERRING HANDPIECE

(71) Applicant: W&H Dentalwerk Bürmoos GmbH, Bürmoos (DE)

(72) Inventors: Karlheinz Eder, Michaelbeuern (AT); Wilhelm Brugger, Wals-Siezenheim (AT)

(73) Assignee: W&H Dentalwerk Bürmoos GmbH, Bürmoos (AT)

( * ) Notice: Subject to any disclaimer, the term of this patent is extended or adjusted under 35 U.S.C. 154(b) by 1 day.

(21) Appl. No.: 15/296,219

(22) Filed: Oct. 18, 2016

(65) Prior Publication Data

US 2017/0035529 A1 Feb. 9, 2017

Related U.S. Application Data

(63) Continuation-in-part of application No. 14/821,404, filed on Aug. 7, 2015, now abandoned.

(30) Foreign Application Priority Data

Aug. 8, 2014 (EP) .................................. 14180304

(51) Int. Cl.
*A61C 1/07* (2006.01)
*A61C 3/03* (2006.01)
(Continued)

(52) U.S. Cl.
CPC .............. *A61C 1/148* (2013.01); *A61C 1/052* (2013.01); *A61C 1/07* (2013.01); *A61C 3/03* (2013.01); *A61C 17/20* (2013.01)

(58) Field of Classification Search
CPC ......... A61C 1/148; A61C 1/0061; A61C 1/07; A61C 3/03; A61C 17/20; A61C 15/048;
(Continued)

(56) References Cited

U.S. PATENT DOCUMENTS 5,801,110 A * 9/1998 Pugliesi ............... A61B 17/062
501/87
2003/0022129 A1* 1/2003 Rahman ................... A61C 1/07
433/119

(Continued)

FOREIGN PATENT DOCUMENTS

DE 102005058879 6/2007
EP 0293654 12/1988
(Continued)

OTHER PUBLICATIONS

Search Report for European Application No. 14180304 (dated Jan. 14, 2015).

*Primary Examiner* — Heidi M Eide
*Assistant Examiner* — Drew S Folgmann
(74) *Attorney, Agent, or Firm* — Klarquist Sparkman, LLP (57) ABSTRACT

A vibration-transmitting medical tool-coupling device includes a first coupling element and a second coupling element, wherein one of the two coupling elements is designed as a coupling protrusion insertible into a coupling recess on the other coupling element, wherein the coupling protrusion and the coupling recess each have a first section having a thread with at least one thread flight for releasable connection of the two coupling elements and one second section which is designed so that the two coupling elements can be positioned relative to one another and are displaceable along the shared longitudinal axis before the two coupling elements can be connected releasably to one another by the thread. A guide ring which extends around the coupling protrusion is provided on one end of the thread which is arranged on the coupling protrusion and the at least one thread flight of the thread ends at this guide ring.

16 Claims, 3 Drawing Sheets

(51) Int. Cl.
*A61C 17/20* (2006.01)
*A61C 1/14* (2006.01)
*A61C 1/05* (2006.01)

(58) Field of Classification Search
CPC ... A61M 11/005; A61M 15/001; A61M 15/085; A61M 16/0816; A61M 37/092; B05B 17/06
See application file for complete search history.

(56) References Cited

U.S. PATENT DOCUMENTS

| | | |
|---|---|---|
| 2006/0234185 A1 | 10/2006 | Ziemba |
| 2009/0239191 A1 | 9/2009 | Wurm |
| 2010/0035203 A1 | 2/2010 | Moessle |
| 2012/0208147 A1 | 8/2012 | Krumsiek |
| 2013/0040263 A1 | 2/2013 | Lesage |
| 2014/0082898 A1* | 3/2014 | Maunder ............ F16B 37/0807 24/517 |

FOREIGN PATENT DOCUMENTS

| | | |
|---|---|---|
| EP | 1728483 | 12/2006 |
| EP | 2160997 A1 | 3/2010 |
| JP | S49100890 A | 9/1974 |
| JP | H07231899 A | 9/1995 |
| JP | 2003-510161 | 3/2003 |
| JP | 2010-516415 | 5/2010 |
| WO | WO2006/090237 | 8/2006 |
| WO | WO2007/013056 | 1/2007 |

* cited by examiner

TOOL-COUPLING DEVICE FOR A VIBRATION TRANSFERRING HANDPIECE

CROSS REFERENCE TO RELATED APPLICATION

The present application is a Continuation-in-Part of U.S. patent application Ser. No. 14/821,404, filed Aug. 7, 2015, which claims priority from pending European Patent Application No. 14180304 filed Aug. 8, 2014, which both are incorporated herein by reference.

FIELD

The present application relates to a tool-coupling device for transferring a driving movement and optionally a working medium from a vibration transferring handpiece to a medical, in particular dental tool that can be operated with vibrations.

DESCRIPTION OF PRIOR ART

Such coupling devices serve to attach a medical tool, which is designed in particular for removal of dental calculus, to a handpiece which has a vibration source. The vibration source is preferably designed as a piezoelectric drive, as a magnetostrictive device or a pneumatic drive and activates the tool by means of sound or ultrasound.

Such a coupling device for a medical handpiece and tool is known in particular from EP 2 160 997 A1.

This coupling device for releasable connection of a tool to a medical handpiece comprises a first coupling element, which is provided on the tool and a second coupling element, which is arranged on the handpiece. The two coupling elements are connected to one another by means of a ball raceway connection and a contact surface for friction connection to ensure a secure seating. Only through a fixed connection of the tool to the vibration source can there be a transfer of the energy of vibration to the tool. The ball raceway connection therefore has a guide groove running in an essentially helical pattern around the longitudinal axis of the coupling device with a guide element of the other coupling element engaging in the guide groove. The contact surface for friction connection is preferably formed by a conical contact surface on the tool and a complementary contact surface on the handpiece. Due to the twisting of the two coupling elements relative to one another, a friction connection is established between the two contact surfaces.

SUMMARY

One goal of the present invention is to create a coupling device for transferring a driving movement, in particular a vibrating movement, from a vibration transferring handpiece to a medical tool, which will make it possible in particular to prevent a faulty connection between the tool and the handpiece, with simplified handling.

According to one exemplary embodiment, the coupling device for transferring a driving movement, in particular a vibrating movement, from a vibration transferring handpiece to a medical, in particular dental, tool, which can preferably be operated with vibrations, comprises a first coupling element, which is provided on the handpiece and a second coupling element, which is provided on the tool, wherein one of the two coupling elements is designed as a coupling protrusion, which can be inserted into a coupling recess on the other coupling element. The coupling protrusion and the coupling recess each have a first section for releasable connection of the two coupling elements and a second section for positioning the two coupling elements relative to their joint longitudinal axis or axis of rotation, wherein the second section on the coupling protrusion and on the coupling recess is formed in such a way that the two coupling elements can be positioned relative one another, are guided toward one another and can be displaced along the joint longitudinal axis or axis of rotation before the two coupling elements can be releasably connected to one another by means of the first section.

The first sections for releasable connection of the two coupling elements preferably each comprise a thread with at least one thread flight each. On one end of the thread, which is arranged on the coupling element designed as a coupling protrusion, in particular a guide ring or flange running around said coupling protrusion is provided. The at least one flight of the thread ends on or at this guide ring or flange, so that a lateral surface of the guide ring or flange is not interrupted by the at least one thread flight of the thread. The lateral surface of the guide ring or flange is preferably designed as a continuous cylindrical lateral surface so that, as can be seen from the following description, a particularly good and stable guidance and support of the two coupling elements on one another can be achieved.

The guide ring or flange which preferably has the continuous, cylindrical lateral surface thus forms an additional bearing section (in addition to the second section for positioning the two coupling elements along their common longitudinal axis or rotational axis) for guiding and supporting the two coupling elements on one another. Accordingly, the guide ring in particular is designed so that the two coupling elements can be positioned relative to one another, guided along one another and shifted along the common longitudinal axis or rotational axis, preferably before the two coupling elements can be coupled releasably to one another by means of the first section. Preferably, the guide ring can be inserted, in particular in the same way as the second section and/or jointly with the second section, in the coupling recess of the other coupling element. The guide ring and the second section are preferably displaceable along the common longitudinal or rotational axis, in particular before the two coupling elements can be coupled releasably to one another by means of the first section, wherein an improved and a more stable support and guidance in the coupling protrusion and the coupling recess are achieved because of the provision of the guide ring, in particular before joining the two coupling elements by means of the thread.

In addition, the guide ring or flange arranged on the thread increases the robustness and stability of the thread. The thread preferably has a maximum angle of rotation of 540° or 1.5 revolutions to the stop. According to a first exemplary embodiment of the coupling device, the first section for releasable connection of the two coupling elements is formed by a screw connection, preferably a multi-start thread, for example, a triple thread. For positioning the two coupling elements relative to one another, the second section and/or the guide ring disposed on the end of the thread preferably has/have a cylindrical guide surface on the coupling protrusion and in the coupling recess. The tightening torque of the screw connection or of the threads preferably amounts to between 30 Ncm and 70 Ncm, preferably 40 Ncm to 60 Ncm, in particular approximately 50 Ncm.

According to a second exemplary embodiment of the coupling device, the first section for releasable connection of the two coupling elements is arranged in front of the second section on the forward end of the lateral surface of the coupling protrusion and on the rear end of the lateral surface of the coupling recess. To be able to more easily introduce the first section of the coupling protrusion into the corresponding section of the coupling recess, the coupling protrusion has a chamfer on its forward end.

According to a third exemplary embodiment of the coupling device, the diameter of the first section on the coupling protrusion and on the coupling recess is smaller than the diameter of the guide ring disposed on the end of the thread and/or of the second section on the coupling protrusion and on the coupling recess. In addition, the length of the first section on the coupling protrusion is preferably less than the length of the second section on the coupling recess, so that the two coupling elements are guided toward one another by means of the second section and are displaceable along the joint axis of rotation before the two coupling elements can be combined with one another by means of the first section. In order to relieve the first section on the coupling protrusion during the transfer of the vibrating driving movement from the handpiece to the tool and/or to reduce the risk of breakage of the coupling protrusion, the second section preferably has a groove-type indentation or constriction on the coupling protrusion.

According to a fourth exemplary embodiment of the coupling device, at least one of the two coupling elements is at least partially made of titanium or a titanium alloy. In addition, at least one of the two coupling elements is preferably provided at least partially with a wear-resistant coating. Alternatively, at least one of the two coupling elements has a hardened surface, which in particular comprises titanium nitride.

According to all the preceding exemplary embodiments, the two coupling elements preferably have a fluid channel, so that a working medium can be supplied to the tool. In addition, the two coupling elements preferably have a stop surface, so that the two coupling elements can be braced against one another in the axial direction to the joint axis of rotation. The stop surface is preferably designed as a flat surface or as a flat stop.

In addition, according to all the preceding exemplary embodiments, preferably a supporting region, in particular in the form of a polygon, is provided for applying a tool wrench to one of the two coupling elements.

According to one exemplary embodiment of a method for releasable connection of a medical, in particular dental, tool, which can preferably be operated with vibrations, to a vibration transferring handpiece by means of a coupling device according to any one of the preceding exemplary embodiments, it comprises the following steps:
  positioning the two coupling elements along their joint longitudinal axis or axis of rotation by inserting the coupling protrusion into the coupling recess until the second section of the coupling protrusion is at least partially arranged in the second section of the coupling recess,
  displacing the two coupling elements toward one another and along their joint longitudinal axis or axis of rotation until the first section of the coupling protrusion engages at least partially in the first section of the coupling recess,
  connecting the two coupling elements by means of the first section on the coupling protrusion and on the coupling recess.

The positioning of the two coupling elements along their common longitudinal axis or axis of rotation by insertion of the coupling protrusion into the coupling recess also includes that the guide ring or flange disposed on the end of the thread is disposed or accommodated in the coupling recess.

The guide ring or flange provided on the thread preferably extends radially from the coupling element and/or the coupling protrusion. The guide ring is preferably designed in the form of a disk. The longitudinal or rotational axis preferably extends centrally through the (disk-shaped) guide ring.

The guide ring or flange and/or the lateral surface of the guide ring preferably has/have a setback or a recess, so that displacement and guidance of the two coupling elements on one another along the common longitudinal axis is advantageously simplified due to the reduced friction. The at least one setback or the at least one recess is either provided only on the surface or the lateral surface of the guide ring or it extends deeper into the guide ring, for example, to the body of the coupling protrusion.

The outside diameter of the guide ring or flange is preferably at least as large as the outside diameter of the thread. The outside diameter of the guide ring is especially preferably greater than the outside diameter of the thread so that the lateral surface of the guide ring protrudes beyond the thread.

The outside diameter of the guide ring or flange is preferably the same size as the outside diameter of the second section of the coupling element designed as a coupling protrusion, so that a particularly good and smooth guidance of the two coupling elements on one another along the common longitudinal or rotational axis is accomplished.

The width, i.e., the axial width with respect to the longitudinal or rotational axis of the guide ring and/or of the lateral surface of the guide ring preferably amounts to between 0.1 mm and 3 mm. The (axial) width of the guide ring and/or of the lateral surface of the guide ring especially preferably changes continuously over at least an arc-shaped section of the lateral surface, in particular because of the approaching of the at least one thread flight to the guide ring.

Preferably the groove-shaped indentation or constriction, which runs around the coupling protrusion and is designed to reduce the risk of breakage of the coupling protrusion and/or the first section due to the transfer of the vibrating drive movement, follows the guide ring or flange, in particular directly. The guide ring or flange and the constriction especially preferably have a common annular wall on which the guide ring ends on its side facing away from the thread and which delimits the constriction axially to the guide ring. This achieves a particularly compact design of the coupling element or the coupling protrusion.

The guide ring or flange preferably is penetrated by a fluid channel extending along the longitudinal axis through the coupling protrusion. The fluid channel preferably comprises a central bore through the vibration axle or the drive axle of the handpiece, in particular through the coupling element and/or the coupling protrusion and/or the guide ring, and is designed to transfer a cooling fluid, in particular water or a water-air mixture.

The coupling protrusion and the coupling recess preferably each include a third section for guiding the two coupling elements along their common longitudinal axis, wherein the first section for releasable connection of the two coupling elements is arranged between the second section for positioning the two coupling elements along their common longitudinal axis and the third section. The third section is in particular arranged on the free end of the coupling element which faces the other coupling element and/or on the free end of the coupling protrusion and/or forms this free end. The third section additionally increases the stability during positioning, guidance and/or bearing support of the two coupling elements on one another. It is of course also possible for the coupling device not to have the first section but instead to have only the third section. The third section for guiding the two coupling elements preferably comprises a cylindrical guide surface on the coupling protrusion and in the coupling recess. The third section is preferably designed undetachably or in one piece with the coupling protrusion and/or the coupling recess. The outside diameter of the third section is preferably smaller than the outside diameter of the first section, in particular of the thread and/or of the guide ring and/or of the second section.

The coupling element provided on the vibration-transmitting handpiece is preferably made of a metallic material which includes in particular titanium or a titanium alloy and has a hardened surface comprising titanium nitride in particular.

The coupling element designed as a coupling protrusion is preferably arranged on the vibration-transmitting handpiece, in particular on its vibration axle or its drive axle and the coupling element that is designed as a coupling recess is arranged on the tool.

The two coupling elements are preferably connected non-detachably, in particular preferably in one piece with a component of the handpiece, in particular with the drive axle or the vibration axle of the handpiece and/or connected non-detachably to the tool.

According to one exemplary embodiment, a vibration-transmitting handpiece which can be connected to a tool that can be operated with vibrations is provided, wherein the handpiece comprises: a vibration-transmitting drive axle or vibration axle, a coupling element which is or can be connected to the vibration axle and is designed as a coupling protrusion that can be inserted into a coupling recess on a coupling element of the tool, wherein the coupling protrusion has a first section designed as a thread having at least one thread flight for releasable connection to the coupling element of the tool and has a second section for positioning the two coupling elements along a common longitudinal axis, wherein the second section is designed so that the two coupling elements can be positioned relative to one another, can be guided along one another and can be shifted along the common longitudinal axis before the two coupling elements can be releasably screwed to one another by means of the thread of the first section, wherein a guide ring or flange running around the coupling protrusion is provided on one end of the thread on which the at least one thread flight of the thread ends, so that a lateral surface of the guide ring or flange is not interrupted by the at least one thread flight of the thread and is preferably designed as a continuous cylindrical lateral surface.

The handpiece and/or the coupling element and/or the coupling protrusion of the vibration-transmitting handpiece may preferably have one or more or all of the features and/or properties described above and below. The handpiece can preferably be connected releasably through the coupling element and/or the coupling protrusion to a tool that can be operated with vibrations, in particular to a tool that can be operated with vibrations and has the features and/or properties described above and below. The present coupling device is characterized by at least the following advantages.

A faulty connection between the tool and the handpiece is prevented due to the design of one section on each of the two coupling elements of the coupling device, which serves to position the two coupling elements relative to their joint axis of rotation and to mount the two coupling elements displaceably, so that they are guided relative to one another and are displaceable along the joint axis of rotation before the two coupling elements can be releasably connected to one another by means of another section. In particular in the design of the additional section as a screw connection with an inside thread and an outside thread due to the targeted guidance of the two coupling elements relative to one another, improper insertion of the outside thread into the inside thread is prevented. These advantages are further enhanced by providing the guide ring that is arranged on the end of the thread.

In addition, the coupling device according to the invention guarantees the user a simple and time-saving method of attaching the tool to the handpiece. It is no longer necessary to repeatedly attach the first coupling element to the second coupling element to properly insert the outside thread on the one coupling element into the inside thread of the second coupling element.

Within the scope of the invention, it is of course self-evident that the coupling device is not limited to vibration transferring handpieces using one vibration source for preparation of surfaces of teeth. Instead such coupling devices may also be used with other driven medical handpieces, such as handpieces that are driven to rotate, for example.

The invention is explained below on the basis of several exemplary embodiments and in conjunction with the accompanying drawings:

DETAILED DESCRIPTION

Figure 1:
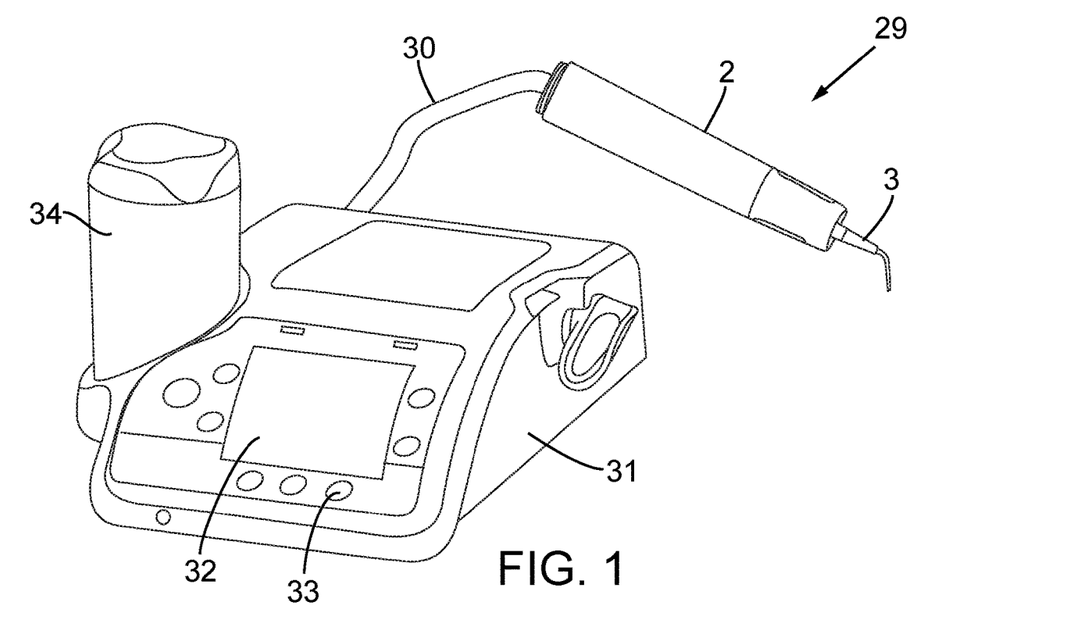
FIG. 1 shows a medical, in particular dental, treatment device with a vibration transferring handpiece and a medical, in particular dental, tool attached thereto.

FIG. 1 shows a medical, in particular dental, treatment device 29 with a vibration transmitting handpiece 2 and a medical, in particular dental, tool 3, which can preferably be operated with vibrations. A vibration source which is preferably designed as a piezoelectric drive is arranged in the handpiece 2. The tool 3 is preferably releasably connected directly to the drive axle of the piezoelectric drive by means of the coupling device, so that the tool 3 can be activated by means of sound or ultrasound. A supply tubing 30 serves to connect the handpiece 2, in particular its drive, to the control unit 31. During operation of the handpiece 2, both the handpiece and the tool 3 are supplied with working media, in particular electricity, as well as spray water for cooling the tool. In addition, the supply tubing 30 serves in particular to transmit electric signals and/or data between the control unit 31 and the handpiece 2. For display and adjustment of the operating parameters for the handpiece 2 as well as for the tool 3, the control unit 31 has at least one display 32 and at least one operating element 33. A container 34 that can be connected to the control unit 31 serves as a fluid source for the spray water for cooling the handpiece 2 and/or the tool.

Figure 2:
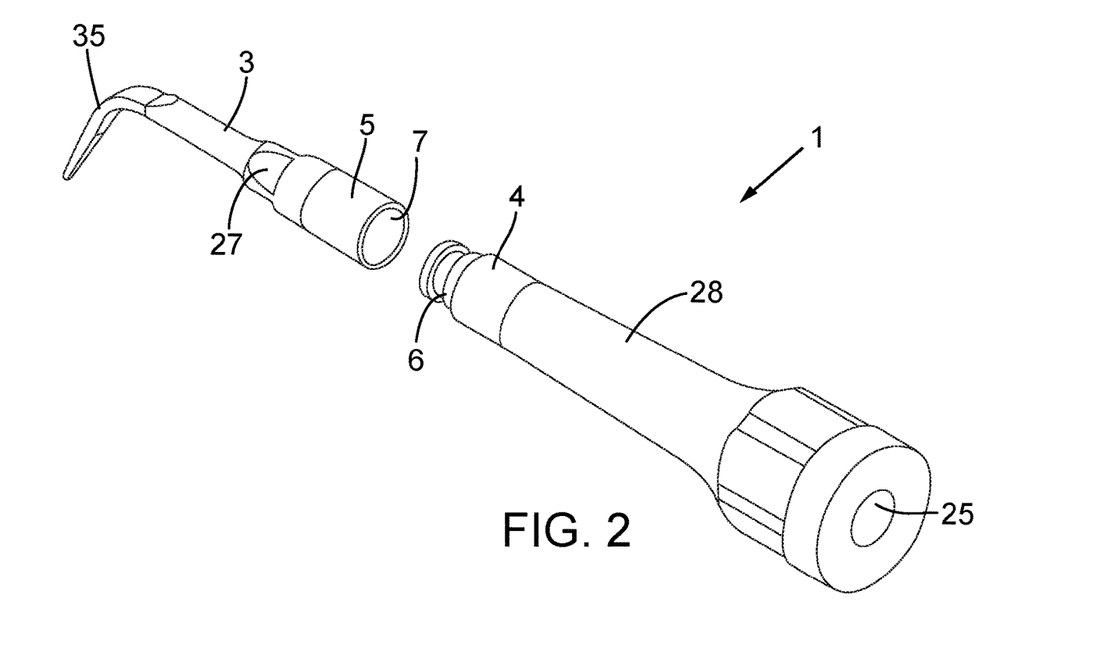
FIG. 2 shows a perspective diagram of the coupling device with a first coupling element that is provided on a drive axle of the handpiece and with a second coupling element that is provided on the tool.

FIG. 2 shows the coupling device 1 according to the invention with a first coupling element 4, which is provided on a vibration axle or drive axle 28 of the handpiece 2 and a second coupling element 5, which is provided on the tool 3. The tool 2 shown here, preferably operable with vibrations for surface treatment of teeth comprises a tool shaft to which a working head 35 is attached. The working head 35 may have a variety of forms. The coupling element 5 is arranged on the opposite end of the shaft, so that the tool 3 can be releasably fastened onto the other coupling element 4, which is preferably connected to the drive axle 28 of the handpiece 2. The coupling element 4 on the drive axle 28 here is preferably designed as a coupling protrusion 6, which can be inserted into a coupling recess 6 on the other coupling element 5. To fasten the tool 3 securely on the drive axle 28 in this exemplary embodiment, the tool 3 has a supporting region 27, which is preferably designed in the form of a polygon. The tool 3 can thus be securely connected to the axle 28 by means of a tool wrench. A central borehole 25 through the drive axle 28 and through the coupling device 1 serves as a fluid channel for transfer of spray water, in particular for internal cooling of the tool.

Figure 3:
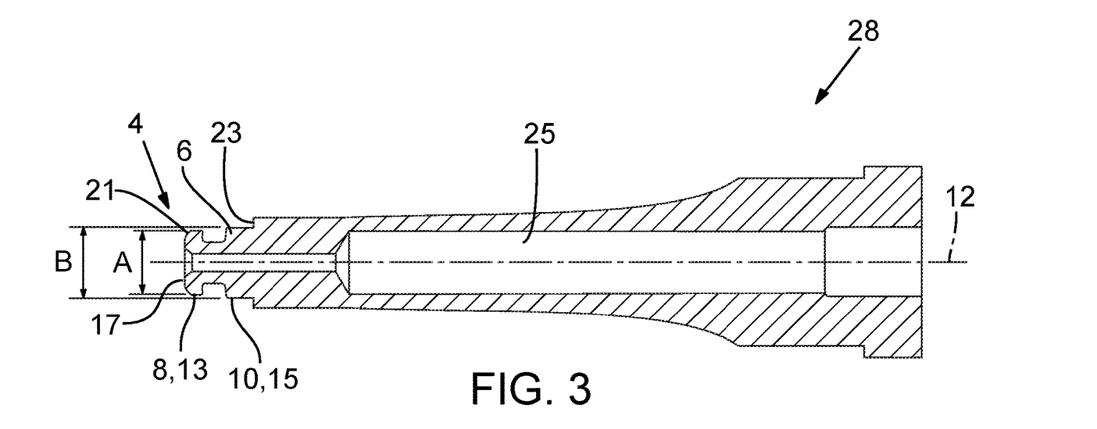
FIG. 3 shows a cross section through the drive axle of the handpiece with the coupling element of the coupling device which is designed as a coupling protrusion.

FIG. 3 shows the vibration axle or drive axle 28 of the handpiece 2 with the coupling element 4 of the coupling device 1, where the coupling element is designed as a coupling protrusion 6. The first section 8 on the coupling protrusion 6 for releasable connection of the two coupling elements 4, 5 in this exemplary embodiment is formed by a screw connection 13, which preferably comprises a multistart thread. The drive axle 28 with the coupling element 4 is preferably manufactured from titanium and has a wear-resistant coating, at least in the area of the screw connection. The second section 10 for positioning the two coupling elements 4, 5 relative to one another is formed by a cylindrical guide surface 15 on the coupling protrusion 6, which extends along the axis of rotation 12. The first section 8 here is arranged on the forward end 17 of the coupling protrusion 6 in front of the second section 10. To facilitate insertion of the first section 8 of the coupling protrusion 6 into the corresponding section 9 of the coupling recess 7, the coupling protrusion 6 has a chamfer 21 on its forward end 17. In order for both coupling elements 4, 5 to be guided by means of the second section 10 and to be displaceable along the joint axis of rotation 12 before the two coupling elements 4, 5 can be connected to one another by means of the first section 8, the diameter A of the first section 8 on the coupling protrusion 6 is designed to be smaller than the diameter B of the second section 10.

The coupling element 4 has a stop surface 23 on the base surface of the vibration axle or drive axle 28, from which the coupling protrusion 6 extends. The stop surface 23 here preferably extends in the radial direction around the coupling protrusion 6. The stop surface 23 is preferably provided with a wear-resistant coating. The corresponding coupling element 5 on the tool 3, which can preferably be operated with vibrations, also has a stop surface 24, so that the two coupling elements 4, 5 can be braced against one another by means of the first section 8, 9, in particular by means of the screw connection 13, 14 in the axial direction relative to the joint axis of rotation 12.

In this exemplary embodiment, the fluid channel 25 in the vibration axle or drive axle 28 extends along the joint axis of rotation 12 through the coupling element 4, in particular through the coupling protrusion 6 with the first and second sections 8, 10 up to the free end 17 of the coupling protrusion 6.

Figure 4:
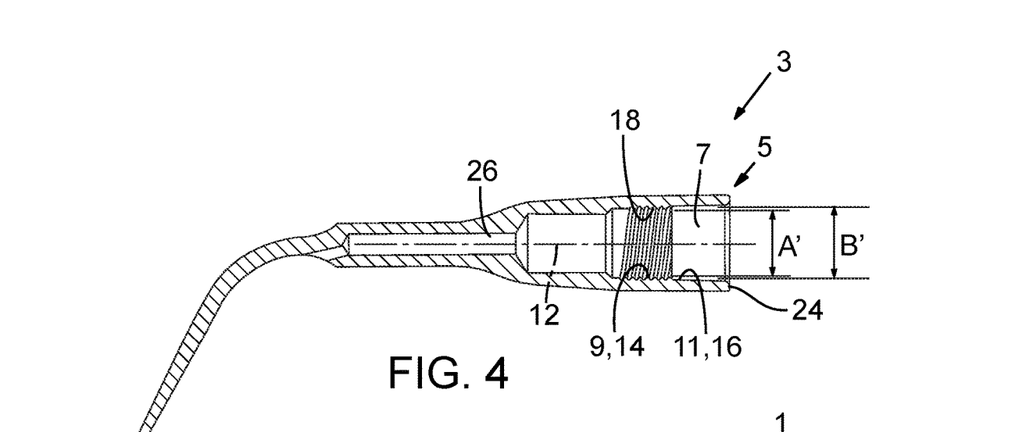
FIG. 4 shows a cross section through the medical tool with the coupling element of the coupling device designed as a coupling recess.

FIG. 4 shows the medical tool 3 that can preferably be operated with vibrations, with the coupling element 5 designed as a coupling recess 7 in the coupling device 1. The first section 9 for releasable connection of the two coupling elements 4, 5 is formed by a screw connection 14 having an inside thread, which can be connected to the outside thread 13 on the coupling protrusion 6. The first section 9 here is arranged on the rear end 18 of the coupling recess 7. The second section 11 in the coupling recess 7 for positioning the two coupling elements 4, 5 relative to one another is also formed by a cylindrical guide surface 16, which extends in the axial direction relative to the joint axis of rotation 12. To accommodate the coupling protrusion 6 shown in FIG. 3 in the coupling recess 7, the diameter A' of the first section 9 is also smaller than the diameter B' of the second section 11. The two coupling elements 4, 5 are displaceable into one another when guided toward or along one another by means of the second section 10, 11 before they can be braced against one another by means of the first section 8, 9 and the stop surfaces 23, 24. The fluid channel 26 in the tool 3 can be connected to the fluid channel 25 in the drive axle by means of the coupling device 1.

Figure 5:
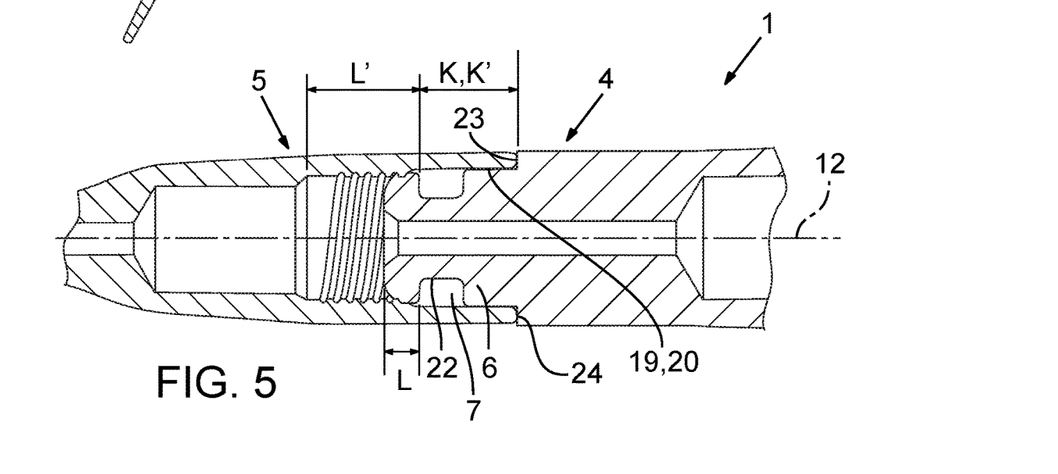
FIG. 5 shows a detailed view of the coupling device, with which the tool and the handpiece, in particular the first coupling element is connected to the second coupling element.

FIG. 5 shows a detailed view of the coupling device 1, in which the tool 3 and the handpiece 2, in particular the first coupling element 4, are securely connected to the second coupling element 5. This secure and releasable connection is achieved by first positioning the two coupling elements 4, 5 relative to their joint axis of rotation 12 in that the coupling protrusion 6 with the lateral surface 19 is inserted into the coupling recess 7 with the lateral surface 20 until the second section 10 of the coupling protrusion 6 is arranged at least partially in the second section 11 of the coupling recess 7. Then the two coupling elements 4, 5 are guided toward or along one another and displaced along the joint axis of rotation 12 until the first section 8 of the coupling protrusion 6 engages at least partially in the first section 9 of the coupling recess 7. Finally, the two coupling elements 4, 5 are screwed together by means of the screw connection on the first sections 8, 9 and are braced securely against one another by means of the stop surfaces 23, 24.

A constriction 22 in the lateral surface 19 of the coupling protrusion 6 serves to relieve the first section 8 on the coupling protrusion 6, in particular the screw connection with the inside thread and outside thread in the transfer of a driving movement, in particular a vibrating movement, from the handpiece 2 to the tool 3 and/or to reduce the risk of breakage of the first section 8.

The lengths L, L' and K, K' of the first section 8, 9 and the second section 10, 11 on the coupling protrusion 6 and on the coupling recess 7 are selected here, so that the two coupling elements 4, 5 are guided toward one another and can be displaced along the joint axis of rotation 12 before they can be releasably connected to one another by means of the first section 8, 9. In this regard, the length L of the first section 8 on the coupling protrusion 6 in particular is smaller than the length K' of the second section 11 in the coupling recess 7, so that the second section 10 of the coupling protrusion 6 engages in the coupling recess 7 before the first section 8 of the coupling protrusion 6 can be inserted into the first section 9 of the coupling recess. The length K of the second section 10 on the coupling protrusion 6 as well as the length K' of the second section 11 on the coupling recess 7 are selected to be as large as possible here, so that accurate positioning and guidance of the two coupling elements 4, 5 relative to one another can take place based on the overlap of the two sections 10, 11.

Figure 6:
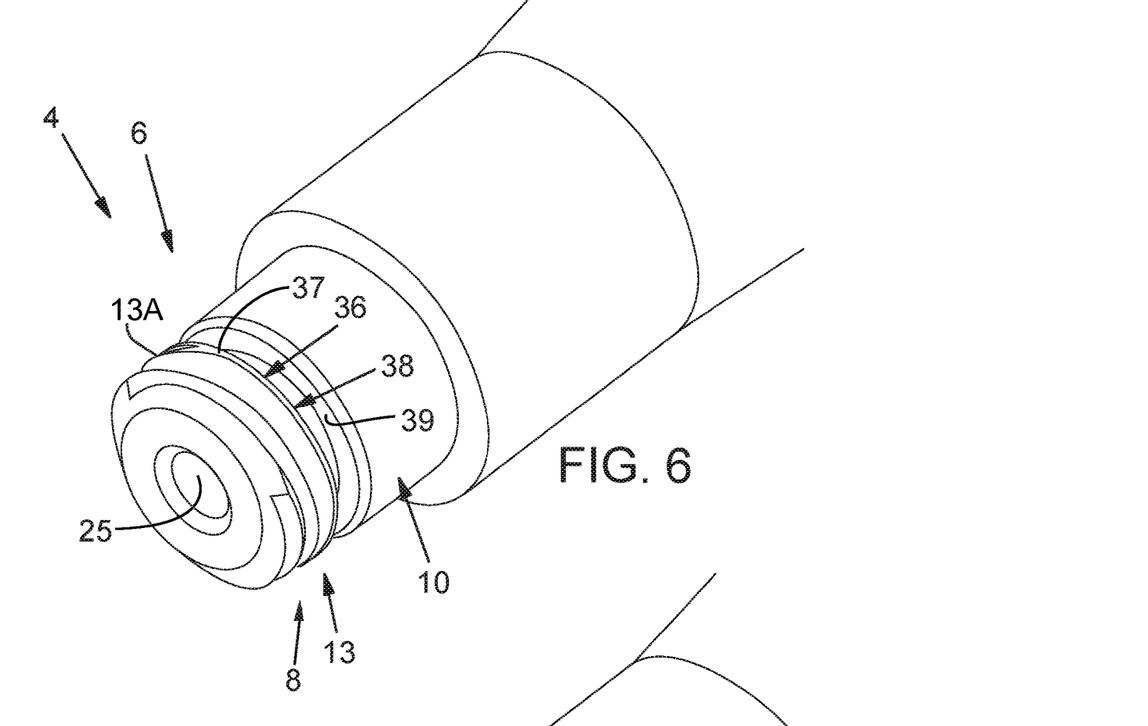
FIG. 6 is a perspective view showing an exemplary embodiment of a coupling element designed as a coupling protrusion, having a thread as a first section for releasable connection of the two coupling elements and a guide ring or flange provided on the thread.
Figure 7:
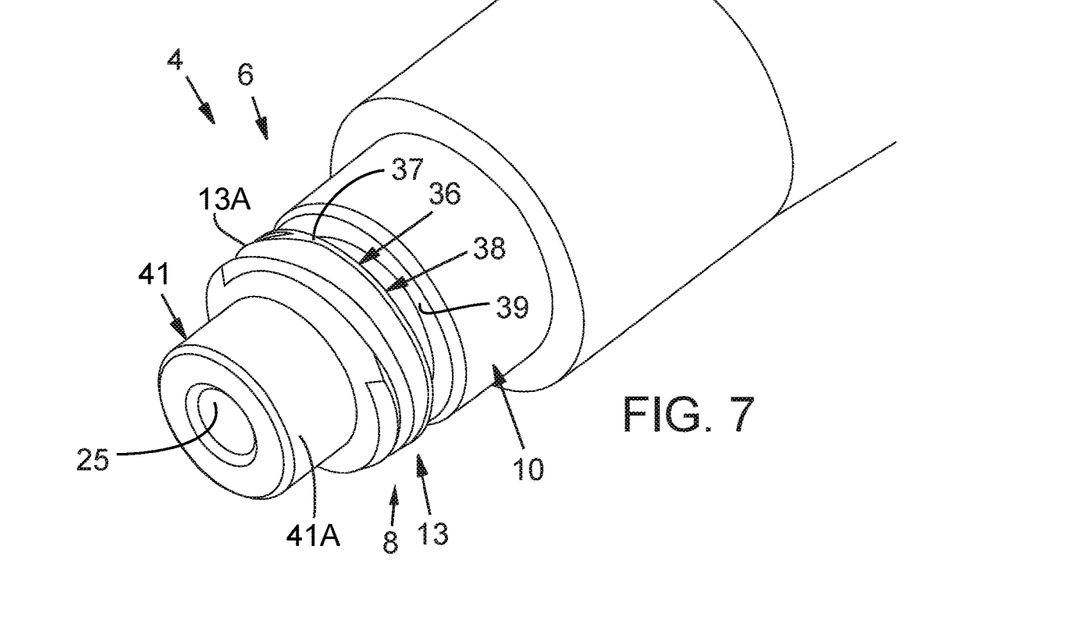
FIG. 7 is a perspective view showing an exemplary embodiment of a coupling element designed as a coupling protrusion having a third section for guiding the two coupling elements along their joint longitudinal axis.

FIGS. 6 and 7 show a coupling element 4 designed as a coupling protrusion 6 with a thread 13 having at least one thread flight 13A as a first section 8 for a releasable connection of the two coupling elements 4, 5. The coupling element 4 and the coupling protrusion 6 are preferably provided on a handpiece 2, in particular on the vibration axle or drive axle 28 or designed as a part thereof, in particular connected in one piece to the vibration axle or drive axle 28.

At one end of the thread 13, in particular the end of the thread 13 that is farther away from the (free) end of the coupling protrusion facing the other coupling element 5, a guide ring or flange 36 is provided that extends around the coupling protrusion 6. The at least one thread flight 13A of the thread 13 ends on the guide ring 36 so that a lateral surface 37 of the guide ring 36 is not interrupted by the at least one thread flight 13A of the thread 13. The lateral surface 37 is designed as a continuous cylindrical lateral surface. The guide ring 36 with the continuous cylindrical lateral surface 37 forms another bearing section for guiding and bearing of the two coupling elements 4, 5 on one another in addition to the second section 10 for positioning the two coupling elements 4, 5.

A constriction 22, which extends around the coupling protrusion 6 and is designed to reduce the risk of breakage of the coupling protrusion 6 and/or the first section 8 due to the transmission of the vibrating driving movement, follows the guide ring or flange 36. The guide ring 36 and the constriction 22 are directly adjacent one another and have a shared annular wall 38 at which the guide ring 36 ends on its side facing away from the thread 13 and which delimits the constriction 22 axially to the guide ring 36.

A second annular wall 39 which is essentially parallel and opposite the first annular wall 38 in particular delimits the constriction 22. The constriction 22 is followed by the second section 10 for positioning the two coupling elements 4, 5 wherein the second annular wall 39 connects the constriction 22 in particular to the second section 10.

The guide ring 36 is penetrated by a fluid channel 25 extending through the coupling protrusion 6 and along the longitudinal axis 12, as already described above.

The coupling protrusion 6 shown in FIG. 7 has a third section 41 for guiding the two coupling elements 4, 5 along their shared longitudinal axis 12. The third section 41 is designed as a cylinder and/or has a cylindrical guide surface 41A. The first section 8 for releasable connection of the two coupling elements 4, 5, in particular the thread 13 and/or the guide ring or flange 36 is arranged between the second section 10 for positioning the two coupling elements 4, 5 along their shared longitudinal axis 12 and the third section 41. It is of course also possible to provide the third section 41, 41A on the coupling elements 4, 5 of FIGS. 1-5, i.e., in particular on coupling elements 4, 5 that do not have a guide ring 36. Alternatively or additionally, with all the exemplary embodiments of FIGS. 1-7 it is also possible to provide only the third section 41, 41A for positioning, guiding and displacing the coupling elements 4, 5 along the shared longitudinal axis 12 and accordingly not to provide the second section 10, 11 on the coupling elements 4, 5.

The exemplary embodiments described or presented here serve in particular to illustrate the invention. The features disclosed in one exemplary embodiment are therefore not limited to this exemplary embodiment but instead can be combined individually or jointly with one or more features of one of the other exemplary embodiments.

The present invention is not limited to the exemplary embodiments described here but instead includes all the embodiments that apply or comprise the basic logical function principal of the invention. In addition, all the features of all the exemplary embodiments described and presented here can be combined with one another.

What is claimed is:

1. A coupling device for transferring a vibrating driving motion from a vibration generating drive of a vibration handpiece to a medical or dental tool for surface treatment of teeth, wherein the coupling device comprises:

a vibration transferring axle coupled to the vibration generating drive of the vibration handpiece and having a first coupling element, the vibration transferring axle and the first coupling element being drivable in a vibrating motion by the vibration generating drive, a second coupling element provided on the tool for surface treatment of teeth and drivable in a vibrating motion by the vibration transferring axle and the first coupling element, wherein the first coupling element and the second coupling element are configured for detachable coupling to each other such that the tool for surface treatment of teeth can be detached from the first coupling element and the vibration transferring axle to decouple the tool for surface treatment of teeth from the vibration generating drive, wherein one of the first and second coupling elements is configured as a coupling recess and the other of the first and second coupling elements is configured as a coupling protrusion that can be inserted into the coupling recess, wherein the coupling protrusion and the coupling recess each have a first section for releasable connection of the first and second coupling elements, a second section for positioning the first and second coupling elements along their joint longitudinal axis, and a respective stop surface for axial abutment, wherein wherein the respective first sections for releasable connection of the first and second coupling elements each have a thread with at least one thread flight, wherein the second sections comprise a cylindrical guide surface on the coupling protrusion and a cylindrical guide surface in the coupling recess, wherein when the cylindrical guide surface on the coupling protrusion and the cylindrical guide surface in the coupling recess are positioned in contact with each other, they align the first and second coupling elements relative to their joint longitudinal axis and are configured to guide the first and second coupling elements displaceably relative to one another along the joint longitudinal axis before the threads of the first sections of the first and second coupling elements can be releasably connected to one another and before the respective stop surfaces abut each other, thereby preventing improper insertion of the first sections of the coupling protrusion and the coupling recess, further comprising a guide ring positioned on the coupling protrusion axially adjacent one end of the thread and axially between the one end of the thread and the cylindrical guide surface of the second section of the coupling protrusion, wherein the guide ring extends from the thread as a continuous cylindrical surface axially and circumferentially, wherein the thread ends at the guide ring such that the continuous cylindrical surface is not interrupted by the thread, wherein the guide ring does not form a thread, and wherein the guide ring stops axial advancement of the respective first sections towards each other, wherein the guide ring forms an additional supporting section for guiding the first and second coupling elements displaceably relative to one another along the joint longitudinal axis before the threads of the first sections of the first and second coupling elements can be releasably connected to one another when the cylindrical guide surfaces of the second sections align the first and second coupling elements relative to their joint longitudinal axis and guide the first and second coupling elements displaceably relative to one another.

2. The coupling device according to claim 1, wherein an outside diameter of the guide ring is at least as large as an outside diameter of the thread.

3. The coupling device according to claim 1, wherein an outside diameter of the guide ring is the same size as an outside diameter of the second section of the coupling element which is configured as a coupling protrusion.

4. The coupling device according to claim 1, wherein an axial dimension of the continuous cylindrical surface is between 0.1 mm and 3 mm.

5. The coupling device according to claim 1, wherein the thread of the first section of the first coupling element or the second coupling element merges into the guide ring, so that over an arc extending in a circumferential direction of the continuous cylindrical surface, an axial width of the continuous cylindrical surface and an axial width of a peripheral surface of the thread form a common continuous surface.

6. The coupling device according to claim 1, further comprising a constriction extending around the coupling protrusion and configured to reduce a risk of breakage of the coupling protrusion and/or the first section due to transfer of the vibrating driving movement, wherein the constriction is between the cylindrical guide surface and the guide ring.

7. The coupling device according to claim 6, wherein the guide ring and the constriction have a shared annular wall at which the guide ring ends on its side facing away from the thread and which borders the constriction axially relative to the guide ring.

8. The coupling device according to claim 1, wherein the coupling protrusion comprises a fluid channel which extends along the longitudinal axis.

9. The coupling device according to claim 1, wherein the coupling protrusion and the coupling recess each comprise a third section for guiding the two coupling elements along their shared longitudinal axis, wherein the first section for releasable connection of the two coupling elements is arranged between the second section for positioning the two coupling elements along their shared longitudinal axis and the third section.

10. The coupling device according to claim 9, wherein the third section for guiding the two coupling elements comprises a cylindrical guide surface on the coupling protrusion and in the coupling recess.

11. The coupling device according to claim 1, wherein the thread of the first and second coupling elements are configured as multi-start threads.

12. The coupling device according to claim 11, wherein the multi-start threads comprise three-start threads.

13. The coupling device according to claim 1, wherein the first coupling element provided on the vibration-transmitting handpiece comprises a metallic material.

14. The coupling device according to claim 13, wherein the metallic material comprises titanium.

15. The coupling device of claim 13, wherein the metallic material comprises a hardened surface.

16. The coupling device according to claim 1, wherein the coupling protrusion is arranged on the vibration-transmitting handpiece, and the coupling recess is arranged on the tool.

* * * * *